United States Patent [19]

Oughton

[11] Patent Number: 5,291,383

[45] Date of Patent: Mar. 1, 1994

[54] SIMPLIFIED UPS SYSTEM

[75] Inventor: George Oughton, Raleigh, N.C.

[73] Assignee: Exide Electronics Corporation, Raleigh, N.C.

[21] Appl. No.: 939,318

[22] Filed: Sep. 2, 1992

[51] Int. Cl.⁵ .......................................... H02M 3/335
[52] U.S. Cl. ...................................... 363/17; 363/98; 363/132
[58] Field of Search .................. 363/16, 17, 37, 95, 363/97, 98, 131, 132

[56] References Cited

U.S. PATENT DOCUMENTS

| | | | |
|---|---|---|---|
| 2,962,649 | 11/1960 | Baum | 321/16 |
| 3,171,968 | 3/1965 | Sanborn | 307/43 |
| 3,256,492 | 1/1966 | Gilcrist | 330/108 |
| 3,935,522 | 1/1976 | Tsay | 318/345 |
| 4,096,394 | 6/1978 | Ullmann et al. | 307/46 |
| 4,471,423 | 9/1984 | Hase | 363/90 |
| 4,475,149 | 10/1984 | Gallios | 363/17 |
| 4,488,057 | 12/1984 | Clarke | 307/66 |
| 4,502,104 | 2/1985 | Mitchell | 363/26 |
| 4,538,073 | 8/1985 | Freige et al. | 307/33 |
| 4,626,697 | 12/1986 | Nelson | 307/18 |
| 4,672,517 | 6/1987 | Mandelcorn | 363/20 |
| 4,698,738 | 10/1987 | Miller et al. | 363/65 |
| 4,814,962 | 3/1989 | Magalhaes et al. | 363/16 |
| 4,841,161 | 6/1989 | Lentini et al. | 307/85 |
| 4,860,184 | 8/1989 | Tabisz et al. | 363/17 |
| 4,860,185 | 8/1989 | Brewer et al. | 363/41 |
| 4,916,329 | 4/1990 | Dang et al. | 307/66 |
| 4,992,919 | 2/1991 | Lee et al. | 363/98 |
| 5,019,717 | 5/1991 | McCurry et al. | 307/66 |
| 5,023,971 | 6/1991 | Yamada | 363/65 |
| 5,065,301 | 11/1991 | Shioya et al. | 363/132 |
| 5,150,286 | 9/1992 | Venditto et al. | 363/97 |
| 5,155,670 | 10/1992 | Brian | 363/132 |

Primary Examiner—Jeff Sterrett
Attorney, Agent, or Firm—Woodcock Washburn Kurtz Mackiewicz & Norris

[57] ABSTRACT

A UPS system comprising a resonant control circuit 100, a gate drive circuit 200, a resonant converter 300, a bootstrap power supply circuit 400 for supplying an isolated DC supply voltage to the resonant control circuit, a bootstrap battery charger 500, and a variable speed fan drive circuit 600.

20 Claims, 4 Drawing Sheets

SIMPLIFIED UPS SYSTEM

FIELD OF THE INVENTION

The present invention generally relates to power supply systems, and more particularly relates to an uninterruptible power supply (UPS) system characterized by simplified topology, reduced parts count and increased reliability.

BACKGROUND OF THE INVENTION

Figure 1:
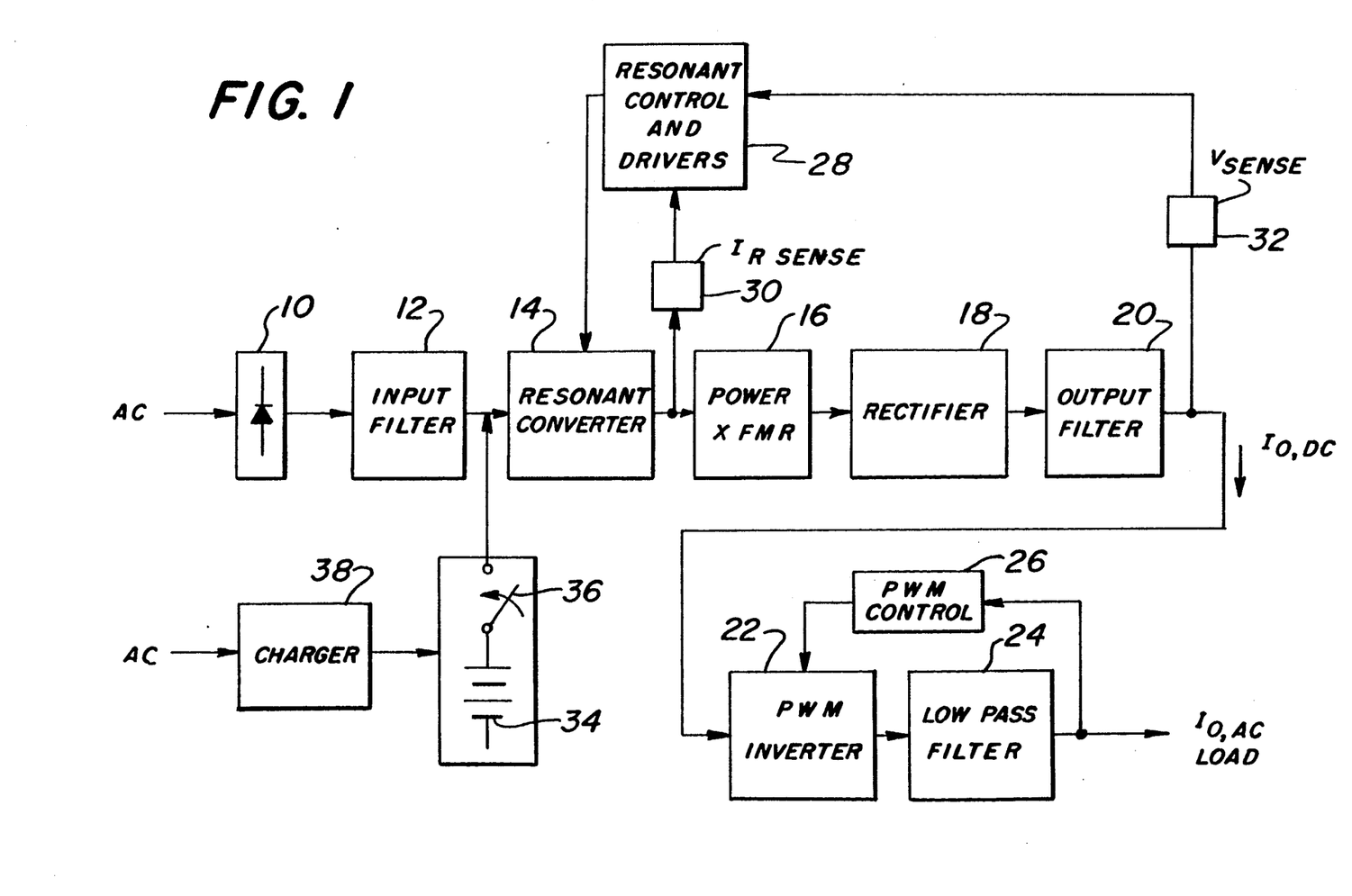
FIG. 1 is a block diagram of a UPS system employing a high frequency resonant converter.

One preferred environment in which the present invention may be utilized is a UPS system. FIG. 1 is a block diagram of such a system. The UPS system depicted in FIG. 1 comprises a rectifier 10 connectable to an AC utility power source, designated AC in FIG. 1. The rectifier 10 provides a DC voltage to an input filter 12 which, in turn, provides unregulated DC voltage to the input of a high frequency resonant converter 14. The resonant converter serves as a current source for an isolation power transformer 16. The power transformer 16 couples the converter 14, and the current from converter 14, to a rectifier 18; the rectifier 18 supplies DC voltage through an output filter 20 to a PWM inverter 22. The current to the transformer is controlled such that the DC voltage output by filter 20 is regulated to the desired voltage. The PWM inverter 22 furnishes an AC voltage to a load (not shown) connected to the UPS system through a low pass filter 24. The UPS system also includes: appropriate control blocks 26, 28 for control of the PWM inverter 22 and the resonant converter 14; sensing devices 30, 32 for sensing the operating current $I_R$ of the converter 14 and the voltage at the output of the output filter 20; a battery 34 connectable to the input of the converter 14 through a switch 36, and a battery charger 38. Typically, power is provided to a constant speed fan (not shown) by a power supply associated with the UPS system. The power supply supplies a fixed voltage that drives the fan at a constant speed regardless of the load on the UPS system.

Known UPS systems have a number of shortcomings. The UPS system depicted in FIG. 1, as well as other known UPS systems, has an inefficient modular topology; i.e., the system includes many separate (non-integrated) functional blocks that do not share parts. The consequences of this modular topology include a high number of parts, high cost, high level of complexity, and low reliability (i.e., low MTFB). In addition, power to run internal cooling fans is difficult to provide, especially where the available AC power varies over wide frequency and voltage ranges and/or where variable fan speed is desired.

SUMMARY OF THE INVENTION

Accordingly, a primary object of the present invention is to provide a simplified power supply system that has a relatively low parts count and cost, and high reliability. A further goal of the invention is to provide a power supply system that includes means for providing DC fan power that varies as a function of the load power such that the fan turns faster as the load power increases. These objects are achieved by the present invention in a power supply system having a simplified topology in which the formerly separate functional circuits are, to a large extent, integrated such that cost and complexity are substantially reduced. Improved reliability is a result of the reduced complexity.

Power supply systems in accordance with the present invention comprise resonant control means for providing gate drive signals; a gate drive circuit comprising a current booster and a first transformer; a resonant converter comprising first and second transistors and a second transformer; and a bootstrap power supply circuit comprising a first auxiliary winding associated with the second transformer and power supply means associated with the first auxiliary winding for supplying an isolated DC supply voltage to the resonant control means. The gate drive circuit's current booster comprises an input coupled to an output of the resonant control means and the first transformer comprises a primary winding coupled to an output of the current booster and two secondary windings. Each resonant converter transistor comprises a gate coupled to a secondary winding of the first transformer, and the second transformer comprises a secondary winding and a primary winding coupled to the transistors. The primary winding of the second transformer is driven by the transistors.

In preferred embodiments of the invention, the bootstrap power supply circuit further comprises means for rectifying voltage across the first auxiliary winding and providing a rectified feedback voltage $V_{fdk}$ to the resonant control means, and means for regulating the rectified voltage and providing a regulated rectified power supply voltage $V_{CC}$ to the resonant control means.

Preferred embodiments also comprise a battery associated with the resonant converter and a bootstrap battery charger comprising a second auxiliary winding associated with the second transformer and means for charging the battery with current derived from the second auxiliary winding. The bootstrap battery charger in preferred embodiments comprises means for rectifying voltage derived from the second auxiliary winding and providing a rectified current to the battery.

In addition, preferred embodiments of the present invention comprise a variable speed fan and a fan drive circuit comprising a third auxiliary winding associated with the second transformer and means for providing a voltage derived from the third auxiliary winding for driving the fan. In preferred embodiments, the fan drive circuit further comprises means for rectifying voltage derived from the third auxiliary winding and providing a rectified voltage $V_{DC\ FAN}$ that varies as a function of load power (e.g., a load current in the secondary winding of the second transformer).

In preferred embodiments, the first and second transistors comprise isolated gate bipolar transistors (IGBTs) coupled in series and a first side of the primary winding of the second transformer is coupled to a node between an emitter of the first transistor and a collector of the second transistor. In addition, the resonant converter in preferred embodiments comprises a first diode coupled between a collector and emitter of the first transistor and a second diode coupled between a collector and emitter of the second transistor; rectifying means for rectifying an AC input signal; a battery switchably coupled in parallel with the rectifying means; a first capacitor coupled in parallel with the rectifying means; a first and a second resonant capacitor coupled in series, the series combination coupled in parallel with the rectifying means; and a resonant inductor coupled from a node between the first and second resonant capacitors to a second side of the primary winding of the second transformer.

The present invention also encompasses power supply means comprising: resonant control means for providing gate drive signals; gate drive means for boosting said gate drive signals; resonant converter means, responsive to boosted gate drive signals from said gate drive means, for converting an AC input source to an isolated and regulated DC output source (which, e.g., may be converted by a PWM inverter to an AC source); and bootstrap power supply means for supplying an isolated DC supply voltage to said resonant control means. Preferred embodiments may also comprise a battery and bootstrap battery charger means for charging the battery, a variable speed fan and fan drive means for providing a fan drive voltage that is a function of load power (e.g., the AC output power), and/or zero current crossing means for sensing when an operating current of the resonant converter means crosses zero and timing the generation of the gate drive signals in response to the zero current crossing means.

According to the present invention, a variable speed fan drive circuit, for use with a power supply system having a variable speed fan and a resonant converter, comprises an auxiliary winding operatively coupled to one of (i) a transformer in the resonant converter and (ii) a resonant inductor in the resonant converter; and rectifying means for providing a DC voltage derived from the auxiliary winding for driving the fan. Preferred embodiments further comprise an inductor $L_{AC}$ coupled between the auxiliary winding and the rectifying means.

The present invention also encompasses methods for operating a power supply system. Methods in accordance with the invention comprise the steps of rectifying an AC input source and storing the rectified signal as a DC voltage; generating a pair of alternately-on gate drive signals; transforming the DC voltage to an isolated DC voltage by carrying out the following substeps: (i) employing said gate drive signals to invert said DC voltage into an alternating current, (ii) sensing said alternating current and controlling the timing of the gate drive signals such that the alternating current has a controlled frequency, (iii) transforming the alternating current having a controlled frequency into an isolated AC voltage, and (iv) rectifying a first portion of the isolated AC voltage into said isolated DC voltage; and rectifying and regulating a second portion of said isolated AC voltage and employing the rectified regulated voltage as a DC supply voltage for powering a further generation of a pair of alternately-on gate drive signals. Preferred embodiments further comprise the step of transforming a portion of a flux generated by the alternating current having a controlled frequency into a DC fan drive voltage. Other features of the invention are described below.

DETAILED DESCRIPTION OF PREFERRED EMBODIMENTS

The present invention is described below in association with a UPS system, although the invention is not limited to use in a UPS environment. A brief overview is given first, and then a detailed structural description is provided.

In one embodiment of the present invention, a resonant mode control IC integrated with a current booster drives a single pulse transformer providing gate drive for a resonant converter. An auxiliary power/sense winding on the main power transformer provides isolated DC voltage feedback and a bootstrap power supply for the resonant control IC. With some modifications, the IC can be used in a true zero crossing control mode. An additional auxiliary winding coupled closely to a high leakage primary winding is employed to provide variable power for driving a DC fan at variable speeds. A bootstrap battery charger is also provided. In this way, the functions of five circuits are performed by one circuit in which a minimum number of components are integrated around a single resonant converter and resonant control IC. Substantial efficiencies are obtained from this integration.

The Unitrode UC3865 is an example of a resonant control IC that can be used in this scheme. The UC3865 includes steering and gating circuitry for generating gate drivers (G1, G2 in FIG. 2). The gate drivers are directly useful in lower power applications and are useful for driving simple current boosters in higher power applications. The use of a pulse transformer allows for level shifting and overall isolation. In preferred embodiments of the present invention, the pulse transformer also inherently assures positive dead time without the added circuitry traditionally needed. (Dead time is when IGBT switches 360, 362 (FIG. 2) are both off.) The low start current of the control IC allows the use of the bootstrap power supply for providing control circuit power.

The below-described embodiment of the present invention provides for the power needs of (1) the control circuit and gate drive, (2) the charger, and (3) the variable speed fan, without the additional active power conversion circuitry typically used. This is possible due to the synergistic combination of circuit characteristics with system requirements. First, the bootstrap power supply winding is closely coupled to the main output secondary, since this voltage is regulated and constant. This is possible due to the current source behavior of the series resonant converter. The transformer couples this current into the fixed output voltage. Second, the fan supply winding is closely coupled to the primary winding so that the effect of the transformer leakage inductance can provide increased fan drive at increased load (power or current) levels. Third, the charger winding can be coupled as described below to modify the basic charge current versus load characteristic. Coupling closely to the primary can increase charge current with increased loading (as with the fan drive).

Where the power train includes a high frequency resonant converter (as in the circuit depicted in FIG. 2), an auxiliary winding on the transformer and/or resonant inductor can provide power having both fixed and variable components of voltage. The voltage can be rectified and used to drive a DC fan at speeds which vary with the load. This provides an appropriate variable speed DC fan drive for a fraction of the cost and complexity commonly encountered.

An auxiliary winding (640, 640', see FIG. 3) on the power transformer of the resonant converter, which may include some leakage flux, or on a resonant inductor ($L_R$) will provide power for a fan. Impedances (preferably inductive) ($L_{AC}$, $L_{DC}$) will affect the response of the fan rectifier circuit in conjunction with the loading effect of the fan itself; that is, whether the DC fan voltage ($V_{DC}$) favors the peak or average AC winding voltage ($V_{AC}$) will be determined by the values of inductors $L_{AC}$, $L_{DC}$. FIGS. 4A and 4B depict typical fan curves (4B) and rectifier performance with the typical fan load (4A). These curves will be, for the most part, unaffected by input line voltages and frequencies. It can be seen that sufficient power is supplied for fan drive and an inherent increase in fan speed will occur as converter load increases, which is when increased cooling is needed.

The increased loading of the rectifier by the fan as percentage load increases will load the fan rectifier circuit down from peak toward average voltage. Thus, the change in fan speed will not be nearly as large as the change in percentage load, with some fixed no load voltage remaining to drive the fan at reduced speed and fan power. Although reduced, this variation provides great benefit in reducing audible fan noise, since perceived audible noise can vary by as much as the cube of fan speed.

Figure 2:
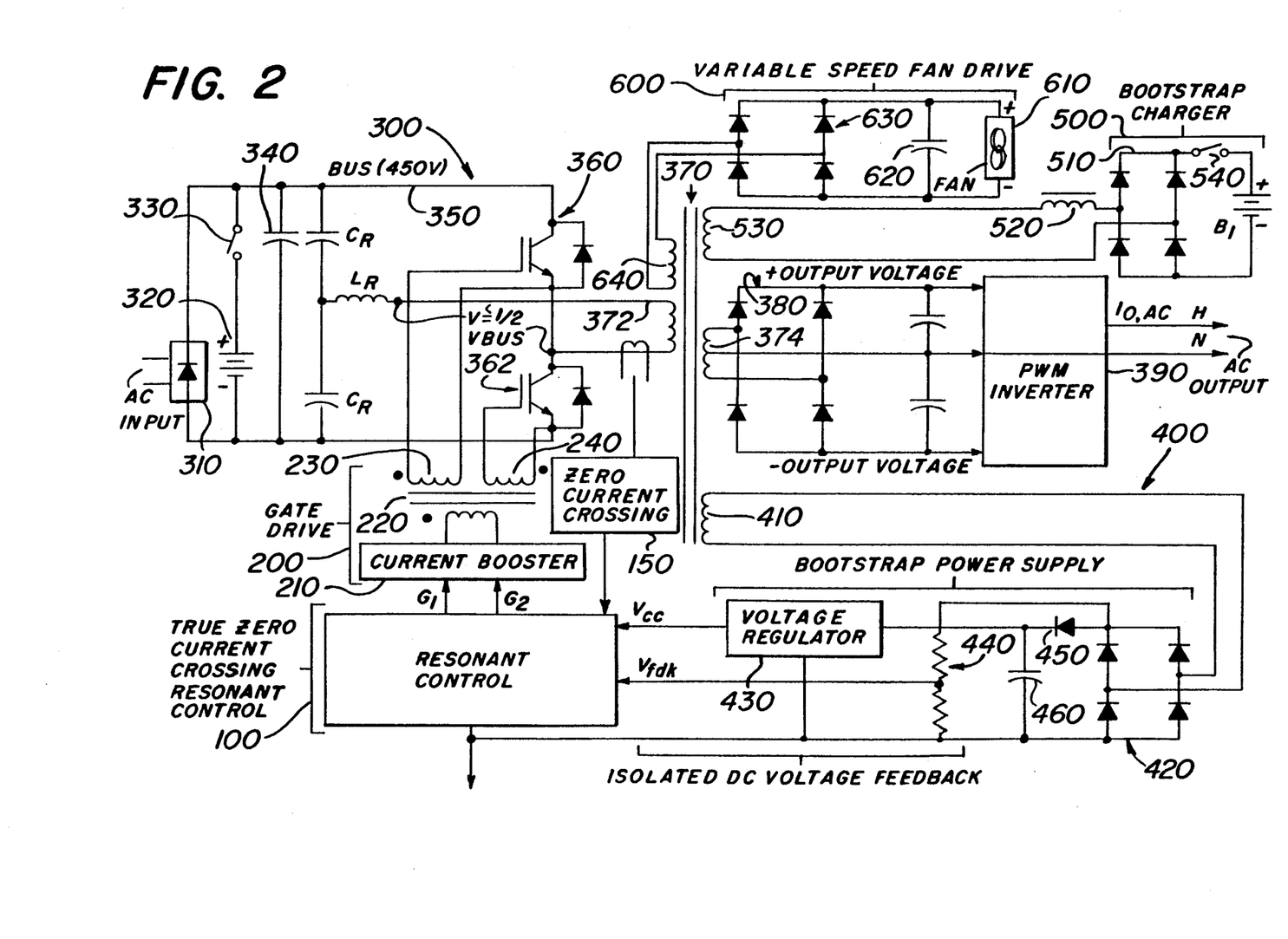
FIG. 2 is schematic diagram of one preferred embodiment of a UPS system in accordance with the present invention.

Referring now to FIG. 2, one preferred embodiment of a UPS system in accordance with the present invention comprises a resonant control circuit 100, a gate drive circuit 200, a resonant converter 300, a bootstrap power supply circuit 400, a bootstrap battery charger 500, and a variable speed fan drive circuit 600.

As mentioned above, the resonant control circuit 100 may comprise a Unitrode UC3865 IC. Further details of this IC can be obtained from Unitrode Application Note U-122, which mentions the use of a bootstrap power supply for supplying power to the UC3865 IC.

The gate drive circuit 200 comprises a current booster 210 and a transformer 220; the transformer 220 includes a primary winding (not numbered) and pair of secondary windings 230, 240.

The resonant converter 300 comprises a rectifier 310, a battery 320 coupled via a switch 330 to the high side of a bus 350, a capacitor 340 coupled between the high side of the bus 350 and the low side of the bus, a pair of resonant capacitors $C_R$, a resonant inductor $L_R$, a pair of IGBT switches 360, 362 coupled to the secondary windings 230, 240 of the gate drive circuit 200, a transformer 370 that includes a primary winding 372 and a secondary winding 374, a full-wave rectifier 380 coupled to the secondary winding 374, and a PWM inverter 390. The PWM inverter provides an AC output current $I_{O,AC}$, which is the load current. In addition, a zero current crossing detector 150 detects when the current in the primary winding 372 crosses zero and provides a signal indicative thereof to the resonant control circuit 100. Upon detecting a zero crossing, the resonant control circuit turns off the gate drive signal that is currently on (or high), e.g., $G_1$, waits a delay time ($\tau_D$), and then turns on the other, previously off gate drive signal, e.g., $G_2$. The delay $\tau_D$ is referred to as dead time.

The bootstrap power supply circuit 400 comprises an auxiliary winding 410 closely coupled to the secondary side of the transformer 370 of the resonant converter 300, a rectifier 420, a voltage regulator 430, a voltage divider circuit 440, a diode 450 and a capacitor 460. The voltage regulator 430 provides a rectified and regulated DC voltage $V_{CC}$ to the resonant control circuit 100; the power divider circuit 440 provides a feedback voltage $V_{fdk}$ to the resonant control circuit.

The bootstrap battery charger 500 is coupled to a battery $B_1$ and comprises a rectifier 510, an inductor 520, an auxiliary winding 530 coupled to the secondary side of the transformer 370 of the resonant converter 300, and a switch 540.

The variable speed fan drive circuit 600 includes (or is coupled to) a DC fan 610, and further includes capacitor 620, a rectifier 630, and an auxiliary winding 640 on the primary side of the transformer 370.

Figure 3:
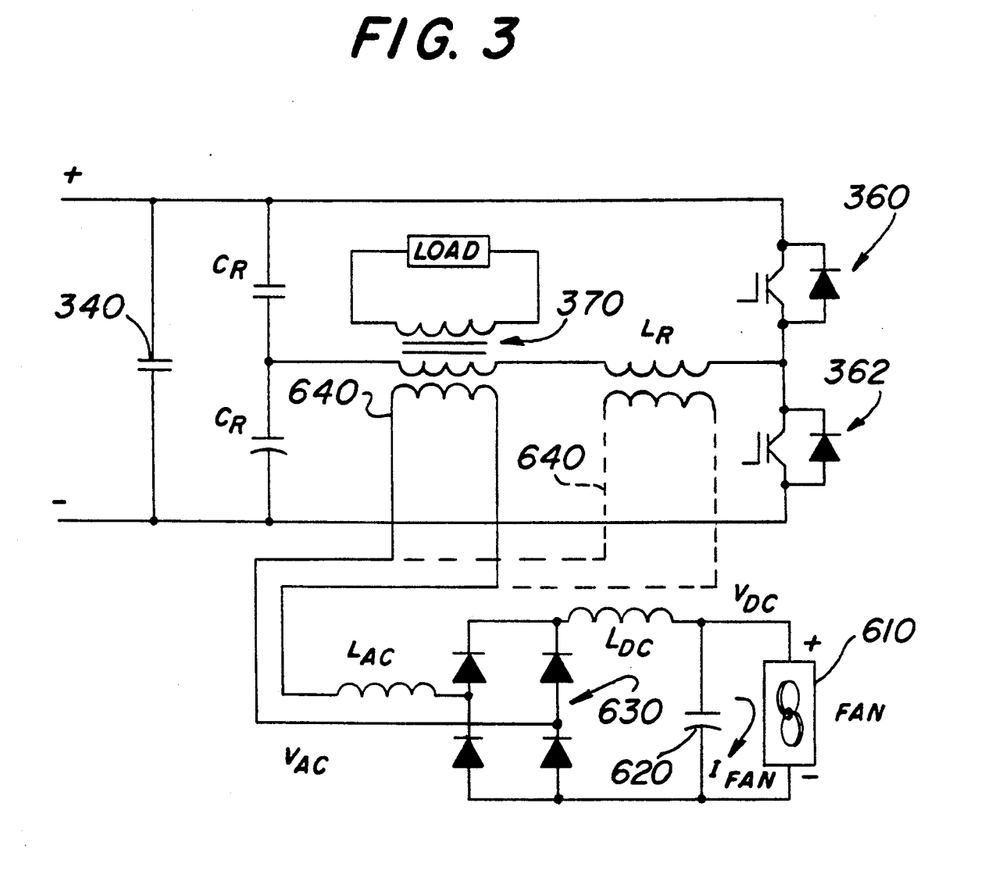
FIG. 3 is schematic diagram illustrating alternative embodiments of a bootstrap fan drive circuit for use in a UPS system in accordance with the present invention.
Figure 4A:
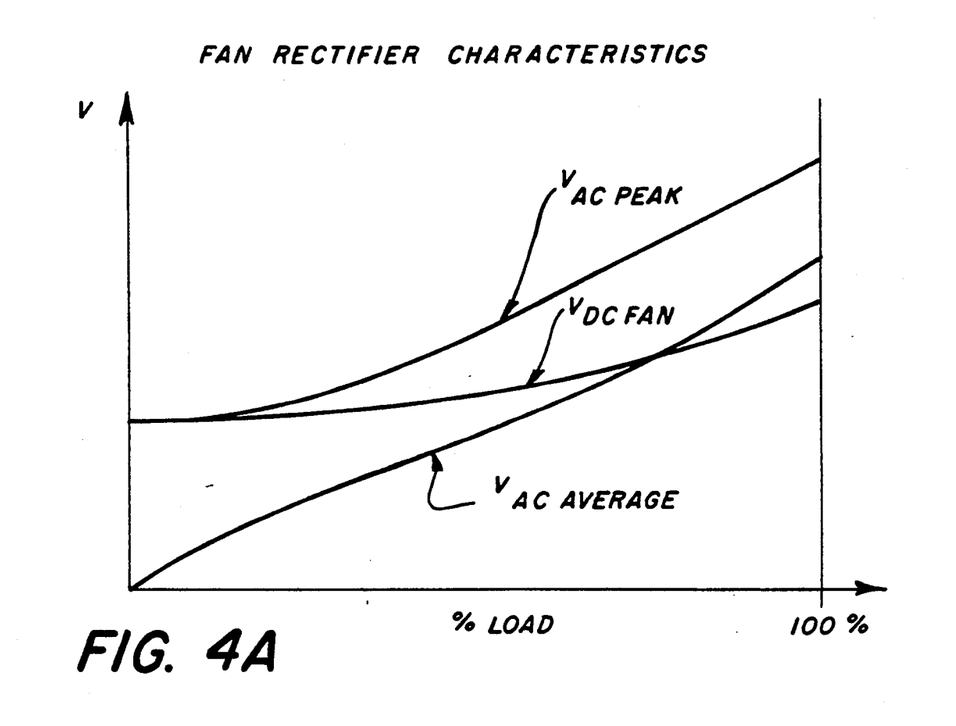
FIG. 4A depicts exemplary voltage versus load characteristics for the fan drive circuit of FIG. 3.
Figure 4B:
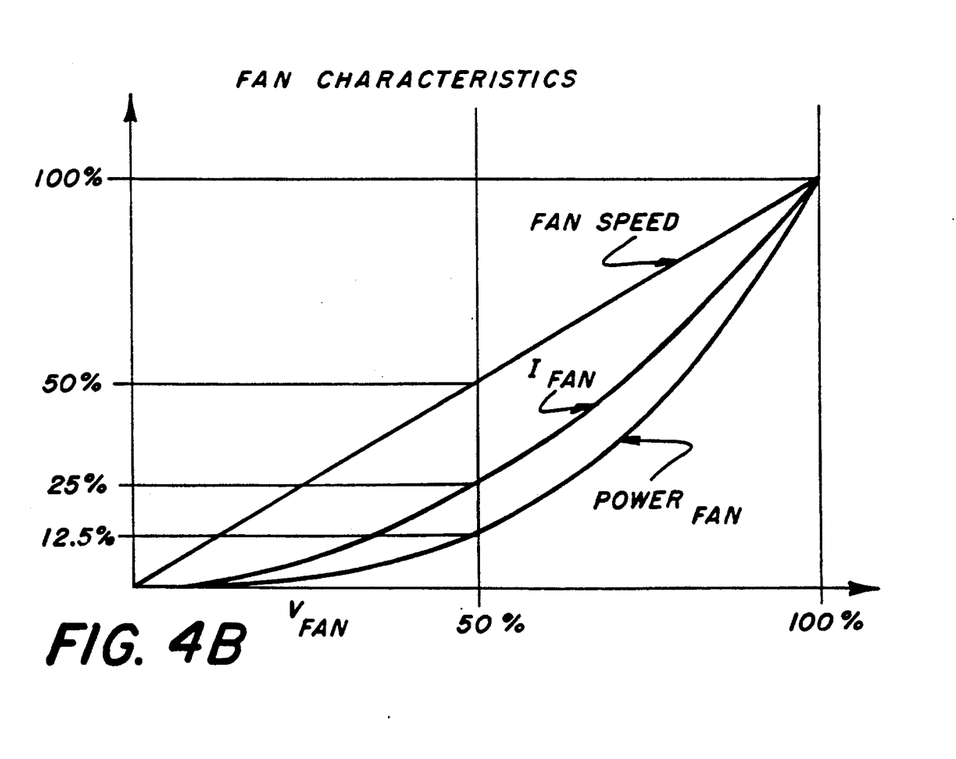
FIG. 4B depicts exemplary fan characteristics.

FIG. 3 depicts alternative embodiments of the fan drive circuit 600. As shown, the auxiliary winding 640 may be coupled to the primary side of the transformer 370 or, alternatively, may be coupled to the resonant inductor $L_R$, as depicted at 640'. In addition, the fan drive circuit 600 may include inductors $L_{AC}$ and $L_{DC}$, which may be used to tailor the output of the rectifier 630 in accordance with the particular needs of the system.

FIG. 4A depicts exemplary voltage versus load characteristics that illustrate how the voltages $V_{AC\ PEAK}$, $V_{DC\ FAN}$ and $V_{AC\ AVERAGE}$ vary as a function of percent load from 0% to 100%. FIG. 4B illustrates how fan speed, fan current $I_{FAN}$ and fan power $POWER_{FAN}$ vary as a function of fan speed. Those skilled in the art will recognize how these characteristics can be changed (tailored) by properly selecting $L_{AC}$ and $L_{DC}$.

Finally, it should be noted that many modifications and variations of the above-described preferred embodiments are within the true scope of the present invention as described in the following claims. For example, the present invention may be carried out with a full bridge resonant converter instead of the half bridge converter described above.

We claim:

1. A power supply system, comprising:
   (a) resonant control means for providing gate drive signals;
   (b) a gate drive circuit comprising a current booster and a first transformer, said current booster comprising an input coupled to an output of said resonant control means, said first transformer comprising a primary winding coupled to an output of said current booster and two secondary windings;
   (c) a resonant converter comprising first and second transistors and a second transformer, each transistor comprising a gate coupled to a secondary winding of said first transformer, said second transformer comprising a secondary winding and a primary winding coupled to said transistors so as to be driven by said transistors; and
   (d) a bootstrap power supply circuit comprising a first auxiliary winding associated with said second transformer and power supply means associated with said first auxiliary winding for supplying an isolated DC supply voltage to said resonant control means.

2. The system recited in claim 1, wherein said bootstrap power supply circuit further comprises:
   means for rectifying voltage across said first auxiliary winding and providing a rectified feedback voltage $V_{fdk}$ to said resonant control means, and means for regulating the rectified voltage and providing a regulated rectified power supply voltage $V_{CC}$ to said resonant control means.

3. The system recited in claim 1, further comprising a battery associated with said resonant converter and a bootstrap battery charger comprising a second auxiliary winding associated with said second transformer and means for charging said battery with current derived from said second auxiliary winding.

4. The system recited in claim 3, wherein said bootstrap battery charger further comprises means for rectifying voltage derived from said second auxiliary winding and providing a rectified current to said battery.

5. The system recited in claim 1, further comprising a variable speed fan and a fan drive circuit comprising a third auxiliary winding associated with said second transformer and means for providing a voltage derived from said third auxiliary winding for driving said fan.

6. The system recited in claim 1, further comprising a resonant inductor coupled to said primary winding of said second transformer, a variable speed fan, and a fan drive circuit comprising a third auxiliary winding operatively coupled to said resonant inductor and means for providing a voltage derived from said third auxiliary winding for driving said fan.

7. The system recited in claim 5, wherein said fan drive circuit further comprises means for rectifying voltage derived from said third auxiliary winding and providing a rectified voltage $V_{DC\ FAN}$ that varies as a function of load power.

8. The system recited in claim 6, wherein said fan drive circuit further comprises means for rectifying voltage derived from said third auxiliary winding and providing a rectified voltage $V_{DC\ FAN}$ that varies as a function of load power.

9. The system recited in claim 1, wherein said first and second transistors are isolated gate bipolar transistors (IGBTs) coupled in series and a first side of said primary winding of said second transformer is coupled to a node between an emitter of said first transistor and a collector of said second transistor.

10. The system recited in claim 9, wherein said resonant converter further comprises:
a first diode coupled %between a collector and emitter of said first transistor and a second diode coupled between a collector and emitter of said second transistor;
rectifying means for rectifying an AC input source;
a battery switchably coupled in parallel with said rectifying means;
a first capacitor coupled in parallel with said rectifying means;
a first and a second resonant capacitor coupled in series, the series combination coupled in parallel with said rectifying means; and
a resonant inductor coupled from a node between said first and second resonant capacitors to a second side of said primary winding of said second transformer.

11. The system recited in claim 1, wherein said bootstrap power supply circuit further comprises means for rectifying voltage across said first auxiliary winding and providing a rectified feedback voltage $V_{fdk}$ to said resonant control means, and means for regulating the rectified voltage and providing a regulated rectified power supply voltage $V_{CC}$ to said resonant control means; and further comprising: (i) a battery associated with said resonant converter and a bootstrap battery charger comprising a second auxiliary winding associated with said second transformer and means for charging said battery with current derived from second auxiliary winding, and (ii) a variable speed fan and a fan drive circuit comprising a third auxiliary winding associated with said second transformer and means for providing a voltage derived from said third auxiliary winding for driving said fan.

12. The system recited in claim 11, wherein said bootstrap battery charger further comprises means for rectifying voltage derived from said second auxiliary winding and providing a rectified current to said battery, and said fan drive circuit further comprises means for rectifying voltage derived from said third auxiliary winding and providing a rectified voltage $V_{DC\ FAN}$ that varies as a function of load power.

13. The system recited in claim 12, wherein said resonant converter further comprises: a first diode coupled between a collector and emitter of said first transistor and a second diode coupled between a collector and emitter of said second transistor; rectifying means for rectifying an AC input source; a battery switchably coupled in parallel with said rectifying means; a first capacitor coupled in parallel with said rectifying means; a second and a third capacitor coupled in series, the series combination coupled in parallel with said rectifying means; and an inductor coupled from a node between said second and third capacitors to a second side of said primary winding of said second transformer.

14. Power supply means, comprising:
(a) resonant control means for providing gate drive signals;
(b) gate drive means for boosting said gate drive signals;
(c) resonant converter means, responsive to boosted gate drive signals from said gate drive means, for converting an AC input source to an isolated and regulated DC output source; and
(d) bootstrap power supply means for supplying an isolated DC supply voltage to said resonant control means.

15. Power supply means according to claim 14, further comprising a battery and bootstrap battery charger means for charging said battery.

16. Power supply means according to claim 14, further comprising a variable speed fan and fan drive means for providing a fan drive voltage that is a function of said AC output power.

17. Power supply means according to claim 14, further comprising a battery, bootstrap battery charger means for charging said battery, a variable speed fan and fan drive means for providing a fan drive voltage.

18. Power supply means according to claim 14, further comprising zero current crossing means for sensing when an operating current of said resonant converter means crosses zero and means for timing the generation of said gate drive signals in response to said zero current crossing means.

19. A method for operating a power supply, comprising the steps of:
(a) rectifying an AC input source and storing the rectified source as a DC voltage;
(b) generating a pair of alternately-on gate drive signals;
(c) transforming said DC voltage to an isolated DC voltage by carrying out the following sub-steps: (i) employing said gate drive signals to invert said DC voltage into an alternating current, (ii) sensing said alternating current and controlling the timing of said gate drive signals such that said alternating current has a controlled frequency, (iii) transforming said alternating current having a controlled frequency into an isolated AC voltage, and (iv) rectifying a first portion of said isolated AC voltage into said isolated DC voltage; and (d) rectifying and regulating a second portion of said isolated AC voltage and employing the rectified regulated voltage as a DC supply voltage for powering a further generation of a pair of alternately-on gate drive signals.

20. The method recited in claim 19, further comprising the step of transforming a portion of a flux generated by said alternating current having a controlled frequency into a DC fan drive voltage.

* * * * *

UNITED STATES PATENT AND TRADEMARK OFFICE
CERTIFICATE OF CORRECTION

PATENT NO. : 5,291,383
DATED : March 1, 1994
INVENTOR(S) : George Oughton, Jr.

It is certified that error appears in the above-indentified patent and that said Letters Patent is hereby corrected as shown below:

At column 7, line 44, delete "%".

Signed and Sealed this

Thirtieth Day of August, 1994

Attest:

BRUCE LEHMAN

*Attesting Officer*     *Commissioner of Patents and Trademarks*